United States Patent [19]
Otsuka et al.

[11] Patent Number: 5,935,540
[45] Date of Patent: Aug. 10, 1999

[54] CLEANING PROCESS FOR HARMFUL GAS

[75] Inventors: Kenji Otsuka; Youji Nawa, both of Kanagawa-ken, Japan

[73] Assignee: Japan Pionics Co., Ltd., Tokyo, Japan

[21] Appl. No.: 09/061,976

[22] Filed: Apr. 17, 1998

[30] Foreign Application Priority Data

Apr. 25, 1997 [JP] Japan ..................................... 9-123347

[51] Int. Cl.$^6$ .............................. B01J 8/00; B01D 53/54; B01D 53/68
[52] U.S. Cl. ................................... 423/239.1; 423/240 S; 423/241
[58] Field of Search ............................ 423/239.1, 240 R, 423/240 S, 241; 95/131, 128

[56] References Cited

U.S. PATENT DOCUMENTS

| 5,176,897 | 1/1993 | Lester ................................... | 423/240 S |
| 5,283,041 | 2/1994 | Nguyen et al. ...................... | 423/240 S |
| 5,417,948 | 5/1995 | Iwata et al. .......................... | 423/240 S |

FOREIGN PATENT DOCUMENTS

| 28 35 030 | 2/1980 | Germany ............................ 423/240 S |
| 37 21 317 | 1/1989 | Germany . |
| 62-273039 | 10/1987 | Japan .................................. 423/239.1 |
| 63-12322 | 1/1988 | Japan . |

OTHER PUBLICATIONS

English abstract for JP 61–287,424, Dec. 1986.
English abstract for JP 61–204,025, Sep. 1986.
English abstract for JP 61–035,830, Feb. 1986.
English abstract for JP 03–181,316, Aug. 1991.
English abstract for JP 62–273,039, Nov. 1987.
*Derwent Abstracts,* AN 96–304414, XP002081730 of JP 08 131764 (Babcock–Hitachi KK), May 28, 1996.
*Derwent Abstracts,* AN 88–025500, XP002081731 of JP 62 286523 (Nippon Pionics KK), Dec. 12, 1987.
*Derwent Abstracts,* AN 82–32395E, XP002081732 of JP 50 119765 (Nichicon Capacitor Ltd), Sep. 19, 1975.

*Primary Examiner*—Ngoc-Yen Nguyen
*Attorney, Agent, or Firm*—Frishauf, Holtz, Goodman, Langer & Chick, PC

[57] ABSTRACT

There is disclosed a process for cleaning a harmful gas which comprises bringing a harmful gas containing at least one member selected from the group consisting of nitrogen fluorides, tungsten fluorides, silicon fluorides, hydrogen fluoride and fluorine, especially nitrogen trifluoride into contact with a cleaning agent comprising stannous oxide as an effective ingredient at a temperature of 200° C. at the lowest. The above process makes it possible to clean the harmful gas in a high performance at a relatively low temperature without by-producing a harmful gas or a gas with a fear of causing environmental pollution.

10 Claims, No Drawings

CLEANING PROCESS FOR HARMFUL GAS

BACKGROUND OF THE INVENTION

1. Field of the Invention

The present invention relates to a process for cleaning a harmful gas. More particularly, it pertains to a process for cleaning a harmful gas containing a nitrogen fluoride, especially nitrogen trifluoride which harmful gas is exhausted from a semiconductor manufacturing process.

2. Description of the Related Arts

With continuous development in semiconductor industry, there has been in recent years, a steady rise in the use amounts of nitrogen fluorides, especially nitrogen trifluoride, which are used for the dry etching of silicon, a silicon compound, a tungsten compound and the like and are also used as a cleaning gas for a chamber of CVD equipment.

Nitrogen trifluoride has been reported to be sparingly soluble in water, considerably stable at room temperature hardly reacting with an acid or an alkali, but highly toxic, and thus have a threshold limit value in time weighted average (TLV-TWA) of 10 ppm. Therefore, in the case where nitrogen trifluoride is exhausted into the atmosphere, it exerts evil influence upon human bodies and environment. Accordingly, nitrogen trifluoride needs to be cleared soon after a nitrogen trifluoride-containing gas is used in a semiconductor manufacturing process prior to the exhaust thereof into the atmosphere.

Nitrogen trifluoride, although being stable at ordinary temperature, forms dinitrogen tetrafluoride, dinitrogen difluoride, dinitrogen hexafluoride, fluorine and the like owing to heating, electric discharge or the like during the step of etching or cleaning. In addition, in the case where etching is carried out under the condition in which nitrogen trifluoride is in contact with silicon, tungsten, a silicon compound, a tungsten compound or the like, the nitrogen trifluoride results in the formation of silicon tetrafluoride and tungsten hexafluoride. The afore-said nitrogen fluorides, fluorine, silicon tetrafluoride and tungsten hexafluoride are each more toxic than nitrogen trifluoride, and therefore must be removed as is the case with nitrogen trifluoride.

As processes for removing nitrogen fluorides that are contained in a gas, there have heretofore been proposed various processes including ① a process in which a nitrogen fluorides-containing gas is brought into contact with metallic silicon at a temperature not lower than 100° C. [Japanese Patent Application Laid-Open No.12322/1988 (Sho 63)]; ② a process in which a nitrogen fluorides-containing gas is brought into contact with metallic titanium at a temperature not lower than 200° C. [Japanese Patent Publication No.48571/1988 (Sho 63)]; and ③ a process in which a nitrogen fluorides-containing gas is brought into contact with any of silicon, boron, tungsten, molybdenum, vanadium, selenium, tellurium, germanium and non-oxide base compounds thereof at a temperature in the range of 200 to 800° C. [Japanese Patent Publication No.48570/1988 (Sho 63)].

Also there have been proposed ④ a process in which a nitrogen fluorides-containing gas is brought into contact with a metal halogenide capable of halogen exchange with nitrogen trifluoride [Japanese Patent Publication No. 48569/1988 (Sho 63)]; ⑤ a process in which a nitrogen fluorides-containing gas is brought into contact with an oxide of a transition metal such as iron, manganese and copper at a temperature not lower than 250° C. [Japanese Patent Application Laid-Open No.181316/1991 (Hei 3)]; and ⑥ a process in which a nitrogen fluorides-containing gas is brought into contact with activated carbon at a temperature in the range of 300 to 600° C. [Japanese Patent Application Laid-Open No.23792/1987 (Sho 62)].

Moreover there have been proposed ⑦ a process in which a nitrogen fluorides-containing gas is brought into contact at a temperature not lower than 200° C. with a catalyst containing a transition metal such as nickel, iron and cobalt or a noble metal such as platinum, rhodium and palladium, said metals being supported on a carrier comprising alumina or silica as a principal component [Japanese Patent Application Laid-Open No.273039/1987 (Sho 62)]; ⑧ a process in which a nitrogen fluorides-containing gas is brought into contact with zirconium or a zirconium-based alloy at a temperature in the range of 100 to 800° C. [Japanese Patent Application Laid-Open No.238128/1994 (Hei 6)]; and like processes.

However, the above-mentioned processes suffer the disadvantages or inconveniences that in the aforesaid processes ①, ② and ③, a volatile fluoride is newly formed as a by-product during cleaning; in the process ④, a halogen gas such as chlorine gas is formed as a by-product; and in the process ⑤, a nitrogen oxide, which is formed as a by-product, makes it imperative to treat itself, thereby not only complicating the process, but also increasing the treatment cost.

In addition, the process ⑥ involves the problem that the treatment at an elevated temperature is accompanied by not only violent reaction but also a danger of explosion and besides, carbon tetrafluoride is formed as a by-product which is relatively stable and difficult to remove.

Moreover, the process ⑦ involves the problem that the treatment, although not being accompanied with the by-production of a harmful gas, must be carried out at a high temperature for the purpose of assuring a sufficient cleaning capacity, for example, the use of iron as a transition metal requires heating to 400° C. or higher in order to obtain a practical cleaning capacity, since the decomposition activity of iron is not sufficiently high at 200° C. The process further involves the problem that some fluorides which are formed with the progress of the reaction cover the surface of a cleaning agent, thereby preventing the reaction from advancing to the inside of the agent resulting in failure to obtain sufficient cleaning capacity.

Further, the process ⑧ has the hazard of causing uncontrollable rapid temperature rise due to the violent exothermic reaction at a high temperature with nitrogen that is usually used as a diluent gas for nitrogen trifluoride.

As described hereinbefore, there has not yet been found out a satisfactory process for removing nitrogen fluorides that are contained in a gas. In such a circumstance, it has been eagerly desired to develop a process for cleaning nitrogen fluorides which has a high treatment capacity at a low temperature without by-producing a harmful gas or a gas having a fear of environmental pollution.

SUMMARY OF THE INVENTION

As a result of intensive research and development accumulated by the present inventors in order to solve the above-described problems involved in the prior arts, it has been found that nitrogen fluorides can be removed in an extremely high efficiency at a relatively low temperature by bringing a nitrogen fluorides-containing gas into contact with a cleanig agent comprising stannous oxide as an effective ingredient; and also that the cleaning process is free from the generation of a by-product which exerts adverse influence upon the environment at the time of cleaning. The present invention has been accomplished by the foregoing finding and information.

That is to say, the present invention relates to a process for cleaning a harmful gas which comprises bringing a harmful gas containing as a harmful component, at least one member selected from the group consisting of nitrogen fluorides, tungsten fluorides, silicon fluorides, hydrogen fluoride and fluorine, into contact with a cleaning agent comprising stannous oxide as an effective ingredient at a temperature of 200° C. at the lowest.

In particular, the present invention relates to a process for cleaning a harmful gas which comprises bringing a harmful gas containing nitrogen trifluoride as a harmful component into contact with a cleaning agent comprising stannous oxide as an effective ingredient at a temperature of 200° C. at the lowest.

Moreover, the present invention further relates to a process for cleaning a harmful gas which comprises bringing a harmful gas containing as harmful components, a nitrogen fluoride along with at least one member selected from the group consisting of tungsten fluorides, silicon fluorides, hydrogen fluoride and fluorine into contact with a cleaning agent capable of removing a fluorine-based compound at ordinary temperature, and thereafter further bringing the harmful gas thus preliminarily treated into contact with a cleaning agent comprising stannous oxide as an effective ingredient at a temperature of 200° C. at the lowest.

DESCRIPTION OF THE PREFERRED EMBODIMENTS

The cleaning process according to the present invention is applied to the cleaning of a harmful gas containing, as a harmful component, a nitrogen fluoride, a tungsten fluoride, a silicon fluoride, hydrogen fluoride and fluorine, especially nitrogen trifluoride as a nitrogen fluoride. The above-mentioned process is applied also to the cleaning of a harmful gas exhausted from a semiconductor manufacturing apparatus in which nitrogen trifluoride or the like is used.

Examples of harmful gases that are the objects of cleaning according to the present invention mainly include nitrogen, argon, helium, and the like each containing nitrogen trifluoride ($NF_3$) as a harmful component. Nitrogen trifluoride, when used for etching or cleaning in a semiconductor manufacturing process, forms dinitrogen tetrafluoride ($N_2F_4$), dinitrogen difluoride ($N_2F_2$), dinitrogen hexafluoride ($N_2F_6$) fluorine ($F_2$) and the like due to heating or electric discharge, reacts with silicon or a silicon compound to produce silicon tetrafluoride ($SiF_4$) and also reacts with tungsten or a tungsten compound to form tungsten hexafluoride ($WF_6$). Therefore, the exhaust gas from a semiconductor manufacturing process in which nitrogen trifluoride is employed, contains nitrogen trifluoride and in many cases, the above-mentioned nitrogen fluorides, fluorine, silicon fluorides, tungsten fluorides and hydrogen fluoride. The process according to the present invention is capable of cleaning the foregoing various gases as well as nitrogen trifluoride.

As described hereinbefore, the cleaning process according to the present invention is applicable not only to nitrogen trifluoride but also to the nitrogen fluorides, silicon fluorides, tungsten fluorides, hydrogen fluoride, fluorine and the mixture thereof.

When a nitrogen fluoride is brought into contact with the cleaning agent in the process of the present invention, the fluorine atoms are fixed as a metal fluoride, while the nitrogen atoms are exhausted as nitrogen gas. When a silicon fluoride and a tungsten fluoride are brought into contact with the cleaning agent in said process, the fluorine atoms are fixed as a metal fluoride, while the silicon and the tungsten are fixed each as a solid compound. Therefore, the cleaning process according to the present invention is capable of cleaning nitrogen trifluoride and further the exhaust gas from a semiconductor manufacturing process in which nitrogen trifluoride is employed without forming a harmful by-product.

Stannous oxide (SnO) is used as an effective component of the cleaning agent in the present invention. Stannous oxide, which is available on the market in the form of powder or the like with at least 98% purity, can be usually used as a raw material of the cleaning agent. Stannous oxide is molded for use as the cleaning agent by molding into pellet or by molding into an irregular form, followed by crushing it into a suitably sized product.

There are available, as the molding process, a wet process and a dry process that have heretofore been well known, including for example, a process by tableting molding stannous oxide; a process wherein stannous oxide is mixed with water to form a slurry or a cake, which is extruded into a molding, and the molding is cut into a suitably sized product, followed by drying; and a process in which the slurry or the cake in said process is granulated and dried.

A molding aid can be used at need at the time of molding for the purpose of enhancing the moldability and the molding strength. There are preferably used as the molding aid, metal fluorides, which are exemplified by lithium fluoride, potassium fluoride, sodium fluoride, magnesium fluoride, calcium fluoride, tin fluoride, lead fluoride, zinc fluoride and copper fluoride. Any of said fluorides may be used alone or as a component of a mixture of at least two fluorides as mentioned above.

In the case of using a molding aid other than the metal fluorides for example, a metal oxide, an inconvenience is sometimes caused in that a nitrogen oxide is by-produced during cleaning.

The amount of the molding aid to be added in preparing the cleaning agent varies depending upon the molding conditions, desired molding strength, etc. and can not be unequivocally specified. An amount thereof, when being too small, results in failure to assure the effect of its addition, whereas an amount, when being unreasonably large, lowers the cleaning capacity. Such being the case, the compositional ratio by weight of the molding aid in the cleaning agent is usually in the range of 0.001 to 0.6, preferably 0.005 to 0.50, more preferably 0.01 to 0.45 based on the stannous oxide.

Of the metal fluorides to be used as the molding aid, potassium fluoride is effective in enhancing the moldability and the molding strength of the cleaning agent. However, the use of potassium fluoride brings about the deterioration of the cleaning capacity more than the proportion of decrease in the content of stannous oxide accompanying the addition thereof. Accordingly, potassium fluoride causes an inconvenience in that it is difficult to add a necessary amount thereof to assure a sufficient molding strength. On the other hand, calcium fluoride, although being low in the effect on enhancing the moldability as compared with other fluorides, is characterized in that it enhances the cleaning capacity of unit weight of the stannous oxide with an increase in the amount of calcium fluoride added thereto.

Moreover, the combinational use of potassium fluoride and calcium fluoride as a molding aid can exhibits excellent working effect of enhancing both the moldability and molding strength without lowering the cleaning capacity. It is thus preferable to employ potassium fluoride and calcium fluoride in combination as a molding aid for the cleaning agent comprising stannous oxide as an effective component.

The ratio based on stannous oxide, of potassium fluoride and calcium fluoride to be added in combination as a molding aid for the cleaning agent, varies depending upon the molding method, desired molding strength, etc. and thus can not be unequivocally specified. With regard to the compositional ratio of the cleaning agent, the ratio by weight of stannous oxide to potassium fluoride to calcium fluoride is usually 1:(0.001 to 0.15):(0.01 to 0.60), approx., preferably 1:(0.005 to 0.12):(0.03 to 0.45), approx., more preferably 1:(0.01 to 0.10):(0.05 to 0.35), approx. An amount of the potassium fluoride, when being less than said range, results in failure to achieve the effect from the addition thereof, whereas an amount thereof, when being more than said range, leads to deterioration of the cleaning capacity. An amount of the calcium fluoride, when being less than said range, results in failure to achieve the effect on preventing the cleaning capacity from being lowered by the addition of potassium fluoride, whereas an amount thereof, when being more than said range, leads to deterioration of the cleaning capacity accompanying the decrease in the content of stannous oxide. At any rate, amounts of the fluorides outside the aforesaid ranges bring about unfavorable results.

In the case of carrying out heat drying of the cleaning agent to be used in the invention in the course of its preparation, said drying is preferably performed in an atmosphere of nitrogen, since stannous oxide, when being brought into contact with oxygen during the heat drying of the cleaning agent, is partially oxidized into stannic oxide, and the resultant stannic oxide contained in the cleaning agent unfavorably forms a nitrogen oxide as a by-product at the time of cleaning. In addition, stannous oxide is oxidized in the air even at room temperature, and therefore it is preferably preserved in an atmosphere of nitrogen.

The shape of the cleaning agent in the form of molding is not limited in particular, but is typified by sphere, column and cylinder. Preferably, the size thereof is in the range of 2 to 12 mm in diameter in the case of spherical form, and is in the range of 2 to 12 mm in diameter and in the range of 2 to 12 mm in height, appprox. in the case of columnar form. It is generally stated that the cleaning agent, when packed for use in a cleaning column, needs to have a particle diameter smaller than about one-tenth the column diameter. The particle diameter in the aforesaid range enables effective cleaning without causing channeling and the like. The packing density of the cleaning agent when it is packed in a cleaning column is usually in the range of 0.8 to 2.5 g/ml, approx.

It is possible in the present invention to use the cleaning agent in a moving bed or a fluidized bed as well as a fixed bed. The cleaning agent is usually packed in a cleaning column, where the harmful gas containing a nitrogen fluoride is passed therethrough to bring the harmful gas into contact with the cleaning agent, whereby the nitrogen fluoride as the harmful component is removed and thus the harmful gas is cleaned.

The temperature at which the harmful gas is brought into contact with the cleaning agent is at least 200° C., fpreferably 200 to 800° C., more preferably 220 to 800° C. A temperature at the time of contact, when lower than 200° C., sometimes results in the deterioration of the cleaning capacity; whereas a temperature at the time of contact, when higher than 800° C., causes an inconvenience that a stainless steel is made impossible to use in the cleaning column, thereby requiring a more heat-resistant material of construction. It is therefore, preferable to maintain the temperature within the above-prescribed range.

Although the pressure at which the harmful gas cleaning is carried out is usually atmospheric pressure, the cleaning can be effected at reduced pressure or under pressure.

The flow velocity of the harmful gas to which the cleaning process of the present invention is applied, is not limited in particular, but it is preferable that the flow velocity be lowered with an increase in the concentration of nitrogen fluorides contained in the gas to be cleaned.

The period of time of contact between the harmful gas and the cleaning agent is at least 0.5 sec., preferably at least 2 sec., and is suitably determined in relation to the concentration of the nitrogen fluorides in the harmful gas, and the like.

The cleaning column is designed according to the concentration of the harmful components, flow rate of the harmful gas and the like. It is preferable from the aspects of cleaning capacity and heat generation accompanying the cleaning reaction to design so that the superficial linear velocity of the gas (LV) ranges from 0.5 to 50 cm/sec for a relatively low concentration of the harmful component being lower than 0.1%; ranges from 0.05 to 20 cm/sec for a concentration of the harmful component being 0.1 to 1%; and becomes at most 10 cm/sec for a relatively high concentration of the harmful component being higher than 1%. In the case of a harmful gas having a high concentration of harmful components such as a harmful gas steadily exhausted from a semiconductor manufacturing process, the general criterion of the superficial linear velocity of the gas (LV) is at most 10 cm/sec.

The exhaust gas formed after nitrogen trifluoride is used for cleaning in a semiconductor manufacturing apparatus, usually contains a tungsten fluoride such as tungsten hexafluoride, a silicon fluoride such as silicon tetrafluoride, hydrogen fluoride and fluorine along with the nitrogen trifluoride. As mentioned hereinbefore, the above-mentioned harmful components can simultaneously be removed by the cleaning process according to the present invention. Incidentally, a tungsten fluoride, a silicon fluoride and fluorine can comparatively easily be removed by the use of a cleaning agent other than stannous oxide even at ordinary temperature. Such being the case, it is made possible to mitigate the load of the cleaning agent comprising stannous oxide and at the same time, to prolong the service life of the cleaning agent by bringing the aforesaid harmful components into contact at ordinary temperature with a cleaning agent other than stannous oxide to remove said components in advance, and thereafter further bringing the pretreated gas into contact at a temperature not lower than 200° C. with a cleaning agent comprising stannous oxide as an effective component to remove only nitrogen fluorides that are difficult to remove with the cleaning agent other than stannous oxide.

Examples of usable cleaning agent capable of cleaning fluorine-based gas at ordinary temperature include a cleaning agent comprising zinc oxide as a principal component [Japanese Patent Application Laid-Open No.237324/1993 (Hei-5)] and a cleaning agent comprising strontium hydroxide as a principal component [Japanese Patent Application Laid-Open No.9921/1997 (Hei-9)]. An exhaust gas coming from a semiconductor manufacturing process can effectively be cleaned by bringing said exhaust gas into contact with said cleaning agent to be used as a pretreatment agent and packed in a cleaning column or the like, and thereafter further bringing the pretreated gas into contact at a temperature not lower than 200° C. with a cleaning agent comprising stannous oxide as an effective component.

On the other hand, in the case where an exhaust gas is brought into contact with a cleaning agent for pretreatment which comprises for example the aforesaid zinc oxide as a principal component and which is capable of cleaning at ordinary temperature, a fluorine-based gas containing tungsten hexafluoride, fluorine, etc., then oxygen is formed as the case may be, by the cleaning reaction at the time when the fluorine-based gas is removed. The resultant oxygen, when brought into contact with a cleaning agent comprising stannous oxide as an effective component, causes such inconvenience as deterioration of the cleaning capacity and by-production of nitrogen oxides.

However, it is made possible to prevent the deterioration of the cleaning capacity and by-production of nitrogen oxides even when the cleaning agent comes in contact with oxygen by increasing the content of calcium fluoride in the cleaning agent comprising stannous oxide as an effective component and by elevating the temperature at which the exhaust gas is brought into contact with the cleaning agent.

In view of the foregoing, it is preferable to set the ratio by weight of stannous oxide to calcium fluoride in the cleaning agent on 1: at least 0.05 and at the same time, to set the temperature at which the exhaust gas is brought into contact with the cleaning agent on at least 250° C.

According to the cleaning process of the present invention, it is made possible to remove nitrogen fluorides such as nitrogen trifluoride that are contained in a gas in high efficiency at a relatively low temperature. Moreover, it is made possible thereby to remove nitrogen fluorides, silicon fluorides, hydrogen fluoride, fluorine, tungsten fluorides and the like together with nitrogen trifluoride that are contained in an exhaut gas coming from a semiconductor manufacturing process wherein nitrogen trifluoride etc. are used.

In addition, it is made possible to efficiently clean an exhaust gas containing fluorine-based harmful components by a process in which an exhaust gas is brought into contact in advance with a pretreating cleaning agent capable of removing at ordinary temperature, tungsten fluorides, silicon fluorides, hydrogen fluoride, fluorine and the like, and thereafter the pretreated gas is further brought into contact at 200° C. or higher with a cleaning agent comprising stannous oxide as an effective component to remove nitrogen trifluoride which is impossible to remove at ordinary temperature.

In the following, the present invention will be described in more detail with reference to comparative examples and working examples, which however shall not limit the present invention thereto.

EXAMPLE 1

To stannous oxide (produced by Wako Pure Chemical Industries Ltd.) in an amount of 1000 g was added 65 g of water with stirring. The cake thus obtained was extruded with an extruder through a 1.6 mm diameter nozzle in a nozzle plate and the extruded product was cut into pellets having a length of about 3 to 5 mm. The resultant pellets were dried by heating at 120° C. for about 12 hours in an atmosphere of nitrogen to prepare 600 g of a cleaning agent.

Subsequently, the resultant cleaning agent was packed in a stainless steel-made cleaning column having an inside diameter of 15.7 mm and a length of 200 mm up to a volume of 19.4 ml (packing Length of 100 mm), and was maintained under heating at 230° C. with a muffle furnace, while helium gas was passed through the cleaning column. Thereafter helium gas containing 1000 ppm of nitrogen trifluoride was passed through the cleaning column under atmospheric pressure at a flow rate of 580.8 ml/min (superficial linear velocity LV of 5 cm/sec.), while a measurement was made of the concentration of nitrogen trifluoride in the gas at the outlet of the cleaning column by means of a detector for nitrogen trifluoride available on the market (produced by Bionics Instrument Manufacturing Co., Ltd. under the trade name" TG-4100 TA). Thus the break through time for nitrogen trifluoride was determined by regarding the point of time when the concentration of nitrogen trifluoride in the gas reached 10 ppm as the break through point.

From the results of the above measurement, the cleaning capacity (volume of the treated nitrogen trifluoride gas in liter (l) per one l of the cleaning agent) was obtained. The results are given in Table 1.

In addition, measurements were made of the concentrations of nitrogen and oxygen in the gas at the outlet of the cleaning column after 120 minutes from the start of the cleaning experiment by means of gas chromatography with a heat conductivity type detector (lower detection limit of 10 ppm for nitrogen and oxygen). At the same time, measurements were made of the the concentrations of nitrogen monoxide (NO) and nitrogen dioxide ($NO_2$) in the gas at the outlet of the cleaning column by means of a detector for the separation and determination of nitrogen oxides(produced by Gas Tec Co.,Ltd., lower detection limit of 1 ppm for NO, 0.5 ppm for $NO_2$). The results are given in Table 2, in which neither oxygen nor a nitrogen oxide was detected.

After the completion of the cleaning experiment, an observation was made of the cleaning agent in the cleaning column. As a result, disintegrated or powdered cleaning agent was not recognized.

EXAMPLE 2

To stannous oxide in an amount of 1000 g was added a solution of 50 g of potassium fluoride (KF, reagent, guaranteed grade, produced by Kanto Chemical Co.,Inc.) in 65 g of water with stirring. The cake thus obtained was extruded with an extruder through a 1.6 mm diameter nozzle in a nozzle plate and the extruded product was cut into pellets having a length of about 3 to 5 mm. The resultant pellets were dried by heating at 120° C. for about 12 hours in an atmosphere of nitrogen to prepare 600 g of a cleaning agent.

Subsequently, the procedure in Example 1 was repeated to carry out cleaning experiment by passing a harmful gas containing nitrogen trifluoride through the cleaning column except that the temperature of the cleaning column was set at 350° C. The results are given in Table 1.

Moreover, in the same manner as in Example 1, analysis was made of the treated gas at the outlet of the cleaning column after 120 minutes from the start of the experiment. The results were same as in Example 1.

TABLE 1

| Example No. | Kind of cleaning agent | Temperature (° C.) | Break through time (min) | Cleaning capacity (l/l cleaning agent) |
| --- | --- | --- | --- | --- |
| 1 | SnO | 230 | 1537 | 46 |
| 2 | SnO + KF | 350 | 1935 | 58 |

TABLE 2

| Kind of measured component | Concentration of component in gas at outlet of cleaning column (ppm) |
|---|---|
| $N_2$ | 550 |
| $O_2$ | n.d (not detected) |
| NO | n.d |
| $NO_2$ | n.d |

EXAMPLE 3

The exhaust gas generated under th e condition wherein plasma cleaning was carried out by using nitrogen trifluoride, in a CVD apparatus which formed silicon films by the use of silane ($SiH_4$) was diluted with nitrogen so that the concentration of nitrogen trifluoride fed to the CVD apparatus corresponded to 1000 ppm. Thus, measurements were made of the concentrations of the harmful components in the diluted exhaust gas by means of a detector tube for hydrogen fluoride (produced by Gas Tec Co.,Ltd., lower detection limit of 2.5 ppm for $F_2$, 0.25 ppm for HF). In addition, analysis was made of the concentration of nitrogen trifluoride with gas chromatography (lower detection limit of 10 ppm). The results are given in Table 3.

The diluted exhaust gas was passed through the cleaning column to clean under the same condition as in Example 1. Thus the break through time for nitrogen trifluoride was determined by regarding the point of time when the concentration of nitrogen trifluoride measured with a detector, in the gas at the outlet of the cleaning column reached 10 ppm, as the break through point. Also, the break through time for a fluorine compound or fluorine was determined by regarding the point of time when the concentration of the fluorine compound or fluorine measured with a detector tube for hydrogen fluoride, in the gas at the outlet of the cleaning column reached 2.5 ppm, as the break through point. From the results of the break through time, there was obtained the cleaning capacity which was denoted with the volume of the nitrogen trifluoride fed to the CVD apparatus. The results are given in Table 4.

TABLE 3

| Harmful component | Concentration (ppm) |
|---|---|
| $NF_3$ | 128 |
| $F_2$, HF or $SiF_4$ | >100 |

[Remarks]
The detector tube for hydrogen fluoride has detection sensitivity for silicon tetrafluoride in addition to hydrogen fluoride and fluorine.

TABLE 4

| Example No. | Kind of cleaning agent | Temperature (° C.) | Break through time (min) | Cleaning capacity (l/l cleaning agent) |
|---|---|---|---|---|
| 3 | SnO | 230 | 1871 | 56 |

EXAMPLE 4

To stannous oxide in an amount of 855 g and 145 g of calcium fluoride ($CaF_2$, produced by Hakutatsu Chemical Laboratories) was added a solution of 25 g of potassium fluoride (KF, reagent, guaranteed grade, produced by Kanto Chemical Co.,Inc.) in 75 g of water with stirring. The cake thus obtained was extruded with an extruder through a 2.0 mm diameter nozzle in a nozzle plate and the extruded product was cut into pellets having a length of about 3 to 5 mm. The resultant pellets were dried by heating at 120° C. for about 12 hours in an atmosphere of nitrogen to prepare 600 g of a cleaning agent.

Subsequently, the procedure in Example 1 was repeated to carry out cleaning experiment by passing nitrogen gas containing 1000 ppm nitrogen trifluoride through the cleaning column except that the temperature of the cleaning column was set at 270° C. The results are given in Table 5.

EXAMPLE 5

The procedure in Example 1 was repeated to carry out cleaning experiment except that the cleaning agent as prepared in Example 4 was used, that the temperature of the cleaning column was set on 270° C. and that nitrogen gas containing 1000 ppm nitrogen trifluoride and 1000 ppm tungsten hexafluoride was passed through the cleaning column. The results are given in Table 5. Since the nitrogen trifluoride and tungsten hexafluoride were both removed before the break through point, and tungsten hexafluoride contained, in one molecule, fluorine atoms twice those in one molecule of nitrogen trifluoride, the cleaning capacity was expressed in terms of the removed amount of nitrogen trifluoride by doubling the removed amount of tungsten hexafluoride.

EXAMPLE 6

The procedure in Example 1 was repeated to carry out cleaning experiment except that the cleaning agent as prepared in Example 4 was used, that the temperature of the cleaning column was set on 320° C. and that nitrogen gas containing 1000 ppm nitrogen trifluoride and 1000 ppm oxygen was passed through the cleaning column. The results are given in Table 5. In addition, analysis was made of the gas at the outlet of the cleaning column after 120 minutes from the start of the experiment in the same manner as in Example 1. The results are given in Table 6.

TABLE 5

| Example No. | Harmful component kind | conc. (ppm) | Temp. (° C.) | Break through time (min) | Cleaning capacity (l/l cleaning agent) |
|---|---|---|---|---|---|
| 4 | $NF_3$ | 1000 | 270 | 1098 | 33 |
| 5 | $NF_3$ + $WF_6$ | 1000 for each | 270 | 785 | 71 ($NF_3$ 23.5 $WF_6$ 23.5) |
| 6 | $NF_3$ + $O_2$ | 1000 for each | 320 | 1170 | 35 |

TABLE 6

| Kind of measured component | Concentration of component in gas at outlet of cleaning column (ppm) |
|---|---|
| $O_2$ | 980 |
| NO | n.d |
| $NO_2$ | n.d |

EXAMPLE 7

To stannous oxide in an amount of 750 g and 250 g of calcium fluoride ($CaF_2$, produced by Hakutatsu Chemical Laboratories) was added a solution of 25 g of potassium fluoride (KF, reagent, guaranteed grade, produced by Kanto Chemical Co.,Inc.) in 90 g of water with stirring. The cake thus obtained was extruded with an extruder through a 2.0 mm diameter nozzle in a nozzle plate and the extruded product was cut into pellets having a length of about 3 to 5 mm. The resultant pellets were dried by heating at 120° C. for about 12 hours in an atmosphere of nitrogen to prepare 600 g of a cleaning agent.

Subsequently a pretreatment column for the treatment of fluorine-based gases was constructed by packing 38.8 ml of a cleaning agent comprising as the effective component, zinc oxide (86% of zinc oxide, 5% of potassium oxide and 9% of alumina) up to a packing length of 200 mm, in a stainless steel-made cleaning column having an inside diameter of 15.7 mm and a length of 300 mm. The above-prepared cleaning agent comprising stannous oxide as the effective component was packed in a cleaning column same as that in Example 1, for use at 320° C. as the post-treatment column.

Thus, cleaning equipment was constructed by connecting with piping, the pretreatment column and the post-treatment column. Then, nitrogen gas containing 1000 ppm nitrogen trifluoride, 1000 ppm silicon tetrafluoride and 1000 ppm fluorine was passed through the pretreatment column kept at ordinary temperature and the post-treatment column kept at 320° C. to carry out cleaning experiment.

In addition, analysis was made of the gas at the outlet of the pretreatment column and the gas at the outlet of the post-treatment column after 120 minutes from the start of the experiment in the same manner as in Example 1. The results are given in Tables 7 & 8. The cleaning capacity for nitrogen trifluoride in the post-treatment column is given in Table 9.

TABLE 7

| Kind of measured component | Concentration of component in gas at outlet of pretreatment column (ppm) |
| --- | --- |
| $NF_3$ | 1010 |
| $SiF_4$ or $F_2$ | n.d |
| $O_2$ | 650 |
| NO | n.d |
| $NO_2$ | n.d |

TABLE 8

| Kind of measured component | Concentration of component in gas at outlet of cleaning column (ppm) |
| --- | --- |
| $NF_3$ | 0 |
| $SiF_4$ or $F_2$ | n.d |
| $O_2$ | 550 |
| NO | n.d |
| $NO_2$ | n.d |

TABLE 9

| Example No. | Harmful component kind | conc. (ppm) | Temp. (° C.) | Break through time (min) | Cleaning capacity (l/l cleaning agent) |
| --- | --- | --- | --- | --- | --- |
| 7 | $NF_3$ + $SiF_4$ + $F_2$ | 1000 each | 320 | 1472 | 44 |

EXAMPLE 8

The procedure in Example 1 was repeated to carry out cleaning experiment except that the cleaning agent as prepared in Example 4 was used, that the temperature of the cleaning column was set on 300° C. and that nitrogen gas containing 1000 ppm nitrogen trifluoride was passed through the cleaning column. The results are given in Table 10.

EXAMPLE 9

To stannous oxide in an amount of 1000 g was added a solution of 25 g of potassium fluoride in 70 g of water with stirring. The cake thus obtained was extruded with an extruder through a 2.0 mm diameter nozzle in a nozzle plate and the extruded product was cut into pellets having a length of about 3 to 5 mm. The resultant pellets were dried by heating at 120° C. for about 12 hours in an atmosphere of nitrogen to prepare 600 g of a cleaning agent.

Subsequently,the procedure in Example 1 was repeated to carry out cleaning experiment except that the above-prepared cleaning agent was used, that the temperature of the cleaning column was set on 300° C. and that nitrogen gas containing 1000 ppm nitrogen trifluoride was passed through the cleaning column. The results are given in Table 10.

TABLE 10

| Example No. | Kind of cleaning agent | Temperature (° C.) | Break through time (min) | Cleaning capacity (l/l cleaning agent) |
| --- | --- | --- | --- | --- |
| 8 | SnO + KF + $CaF_2$ | 300 | 1411 | 42 |
| 9 | SnO + KF | 300 | 1198 | 36 |

COMPARATIVE EXAMPLE 1

To stannic oxide ($SnO_2$, reagent, guaranteed grade, produced by Kanto Chemical Co.,Inc.) in an amount of 1000 g was added a solution of 50 g of potassium fluoride (KF, reagent, guaranteed grade, produced by Kanto Chemical Co.,Inc.) in 65 g of water with stirring. In the same manner as in Example 1, the resultant cake was formed into a cleaning agent.

By the use of this cleaning agent, cleaning experiment was carried out for a harmful gas containing nitrogen trifluoride in the same manner as in Example 1. In addition, analysis was made of the concentration of the harmful components in the gas at the outlet of the cleaning column after 120 minutes from the start of the experiment in the same manner as in Example 1. During the exprimental period it was possible to remove nitrogen trifluoride but a large amount of nitrogen oxides were by-produced in concentration exceeding the TLV-TWA, whereby the cleaning experiment was discontinued. The results are given in Table 11.

COMPARATIVE EXAMPLE 2

To manganese dioxide ($MnO_2$, reagent, guaranteed grade, produced by Kanto Chemical Co.,Inc.) in an amount of 1000 g was added a solution of 50 g of potassium fluoride (KF) in 65 g of water with stirring. In the same manner as in Example 1, the resultant cake was formed into a cleaning agent.

By the use of this cleanig agent, cleaning experiment was carried out for a harmful gas containing nitrogen trifluoride in the same manner as in Example 1. In addition, analysis was made of the concentration of the harmful components in the gas at the outlet of the cleaning column after 120 minutes from the start of the experiment in the same manner as in Example 1. During the exprimental period it was possible to remove nitrogen trifluoride but a large amount of nitrogen oxides were by-produced in concentration exceeding the TLV-TWA, whereby the cleaning experiment was discontinued. The results are given in Table 11.

COMPARATIVE EXAMPLE 3

Cupric oxide (CuO, reagent, guaranteed grade, produced by Kanto Chemical Co.,Inc.) was molded into pellets having a diameter of 5 mm and a length of 5 mm by the use of a tableting molding machine. The resultant pellets were made into a crushed product having a particle diameter of 3 to 5 mm. By the use of this crushed product as the cleanig agent, cleaning experiment was carried out for a harmful gas containing nitrogen trifluoride in the same manner as in Example 1. In addition, analysis was made of the concentration of the harmful components in the gas at the outlet of the cleaning column after 120 minutes from the start of the experiment in the same manner as in Example 1. During the exprimental period it was possible to remove nitrogen trifluoride but a large amount of nitrogen oxides were by-produced in concentration exceeding the TLV-TWA, whereby the cleaning experiment was discontinued. The results are given in Table 11.

COMPARATIVE EXAMPLE 4

The cleaning agent used herein was Hopkalite available on the market (produced by Nissan Girdler Catalyst Co., Ltd.) in the form of extrusion molded pellet which had a diameter of 1.5 mm and a length of 3 to 5 mm, and chemical composition by weight consisting of 50% of manganese dioxide (MnO2), 22% of cupric oxide (CuO), 12.5% of magnesium oxide (MgO), 12.5% of aluminum oxide ($Al_2O_3$) and 3% of others. By the use of this cleanig agent, cleaning experiment was carried out for a harmful gas containing nitrogen trifluoride in the same manner as in Example 1. In addition, analysis was made of the concentration of the harmful components in the gas at the outlet of the cleaning column after 120 minutes from the start of the experiment in the same manner as in Example 1. During the exprimental period it was possible to remove nitrogen trifluoride but a large amount of nitrogen oxides were by-produced in concentration exceeding the TLV-TWA, whereby the cleaning experiment was discontinued. The results are given in Table 11.

TABLE 11

| Comp. Example | Kind of cleaning agent | Concentration of harmful components at outlet of cleaning column (ppm) | | |
|---|---|---|---|---|
| | | NO | $NO_2$ | $NF_3$ |
| 1 | $SnO_2$ | >200 | n.d | n.d |
| 2 | $MnO_2$ | >200 | n.d | n.d |
| 3 | CuO | >200 | n.d | n.d |
| 4 | $MnO_2$.CuO MgO.$Al_2O_3$ | >200 | n.d | n.d |

What is claimed is:

1. A process for cleaning a harmful gas which comprises bringing a harmful gas containing at least one member selected from the group consisting of nitrogen fluorides, tungsten fluorides, silicon fluorides, hydrogen fluoride and fluorine into contact with a cleaning agent comprising stannous oxide in an amount effective to remove fluoride or fluorine from said harmful gas at a temperature of at least 200° C.

2. The process for cleaning a harmful gas according to claim 1, wherein the harmful gas contains nitrogen trifluoride.

3. The process for cleaning a harmful gas according to claim 1 which further comprises the pretreatment step of bringing a harmful gas containing as harmful components, nitrogen trifluoride along with at least one member selected from the group consisting of tungsten fluorides, silicon fluorides, hydrogen fluoride and fluorine into contact with a cleaning agent capable of removing a fluorine-based compound at ambient temperature.

4. The process for cleaning a harmful gas according to any of the preceding claims, wherein the cleaning agent comprising stannous oxide is prepared by heat drying in an atmosphere of nitrogen.

5. The process for cleaning a harmful gas according to any of claims 1 to 3, wherein the harmful gas is brought into contact with the cleaning agent comprising stannous oxide at a temperature in the range of 200 to 800° C.

6. The process for cleaning a harmful gas according to any of claims 1 to 3, wherein the cleaning agent comprising stannous oxide in an amount effective to remove fluoride or fluorine from said harmful gas further comprises a metal fluoride as a molding aid.

7. The process for cleaning a harmful gas according to claim 6, wherein the ratio by weight of the stannous oxide to the molding aid in the cleaning agent is in the range of 1:(0.001 to 0.6).

8. The process for cleaning a harmful gas according to claim 6, wherein the metal fluoride is potassium fluoride or a composition of potassium fluoride and calcium fluoride.

9. The process for cleaning a harmful gas according to claim 8, wherein the metal fluoride is a composition of potassium fluoride and calcium fluoride, and the ratio by weight of the stannous oxide to the potassium fluoride to the calcium fluoride in the cleaning agent is 1:(0.001 to 0.15): (0.01 to 0.60).

10. The process for cleaning a harmful gas according to any of claims 1 to 3, wherein the harmful gas is an exhaust gas coming from a semiconductor manufacturing apparatus.

* * * * *